May 16, 1933.  G. WHEAT  1,909,325

STORAGE BATTERY

Filed July 22, 1930

INVENTOR
Grant Wheat,
BY
J. H. M°Cready,
his ATTORNEY.

Patented May 16, 1933

1,909,325

UNITED STATES PATENT OFFICE

GRANT WHEAT, OF MARLBORO, MASSACHUSETTS, ASSIGNOR TO KOEHLER MANUFACTURING COMPANY, OF MARLBORO, MASSACHUSETTS, A CORPORATION OF MASSACHUSETTS

STORAGE BATTERY

Application filed July 22, 1930. Serial No. 469,733.

This invention relates to storage batteries and to plates for storage batteries. The invention is more especially concerned with that type of storage battery plate which includes a series of core members all connected to a common bus, each of the core members being enclosed in an insulating tube which is filled with lead oxide or some other active material. Usually the ends of the tubes opposite to the bus are closed by a cap held against the ends of the tubes by its connection with the core members. When such a plate is in use the active material in the tube tends to expand and this tendency frequently is sufficient to separate the caps from the core members and allow them to drop into the bottom of the battery. This releases the active material in the tubes and renders the plate useless.

The present invention deals especially with these conditions and it aims to improve the construction of storage battery plates with a view to obviating the difficulties just described.

The nature of the invention will be readily understood from the following description when read in connection with the accompanying drawing, and the novel features will be particularly pointed out in the appended claims.

Figure 1:
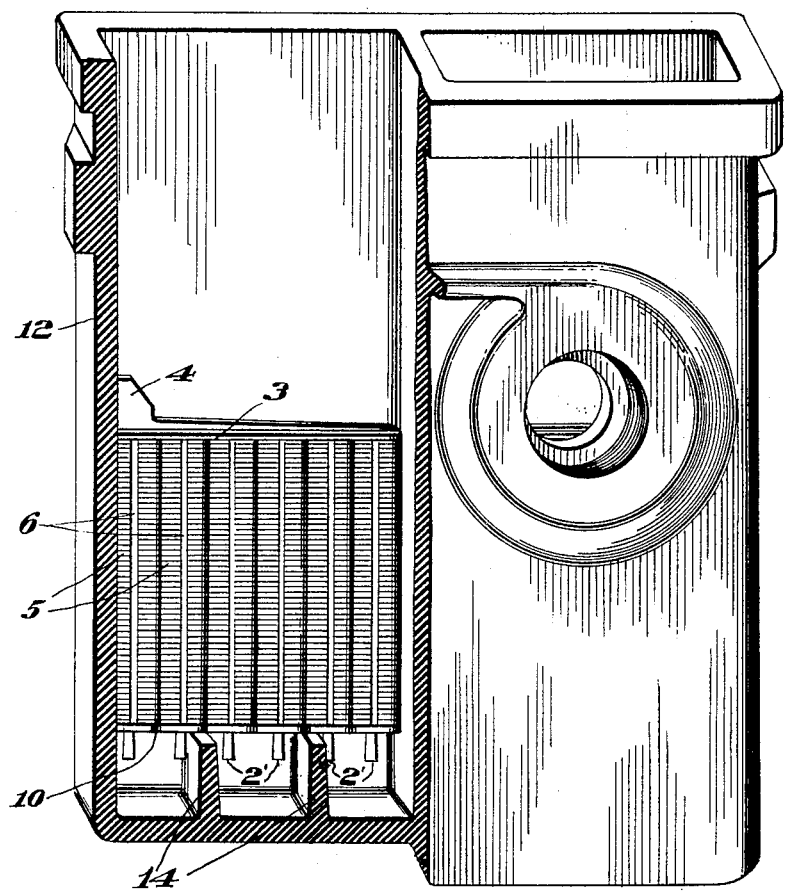
Figure 1 is a view, partly in side elevation and partly in vertical section, of a battery embodying features of this invention.
Figure 3:
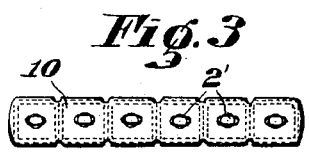
Fig. 3 is a bottom view of the plate shown in Fig. 2.

The battery and plate shown are designed more especially for use in small units, such for example as those used for supplying current for miner's lamps, although the invention is equally applicable to larger units. The plate comprises a series of core members 2, preferably of lead, and usually cast integral with a bar or bus 3 which, in the usual arrangement, is located at the upper edge of the plate. An ear or lug 4 is formed integral with the parts 2 and 3 and is designed to facilitate the connection of the bus 3 with similar busses of other plates of the set. Each of the cores 2 is enclosed in a tubular insulator 5, usually made of hard rubber, and each tube is somewhat flattened in shape to reduce the total thickness of the plate. Each tube also is provided with longitudinal ribs 6—6 at diametrically opposite points, the tubes being cut or slotted transversely between the ribs at frequent intervals, as in prior constructions.

Figure 2:
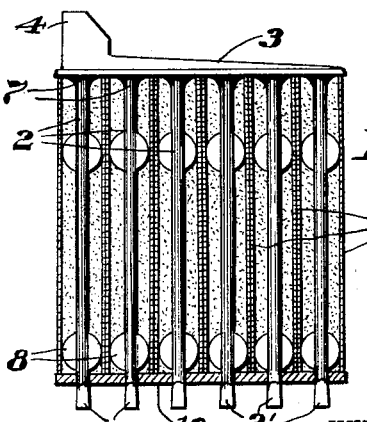
Fig. 2 is a side view of a battery plate constructed in accordance with the invention.
Figure 4:
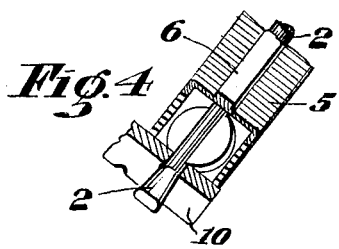
Fig. 4 is a perspective view, partly in section, showing certain details of the plate construction.

In order to center the tubes 5 with reference to their respective cores, the bar or bus 3 is provided on its lower side with tapered portions 7, Fig. 2, connecting the respective cores with the bus, these parts 7 corresponding in shape to the internal cross-sectional shape of the core members. For this purpose also each tube is provided at its lower end with a fin 8 to bear against the inner walls of the tubes. The space between each core and its insulating tube is filled with red lead or any other suitable active material.

The lower ends of the tubes are closed by an insulating cap 10 made of hard rubber or any other suitable insulating material. The ends of the core members 2 project through holes in the cap 10 and have end portions 2' which extend for a considerable distance beyond the cap. These end portions 2' are upset or shaped in some manner to make them slightly larger in certain cross-sectional dimensions than are the holes in the cap through which the core members extend, so that as the tubes expand longitudinally or "grow" while the plate is in use and force the cap 10 along the core extensions 2', these extensions will hold the cap frictionally in any position to which it is moved. In other words, the parts 2' are made enough larger than the holes in the cap so that they will bind firmly in the holes and yet will permit the pushing of the bar along the cores toward their extremities without breaking the cap. This upsetting or shaping of the core extensions 2' may be performed in several ways, as for example, by flattening them slightly, upsetting them longitudinally, or changing their cross-sectional form in various ways.

According to the preferred method of assembling the parts of the plate, the bar 3 is located in an inverted position with the core members projecting upwardly and is held in a suitable fixture or jig. The insulators are then placed on the core members and centered on the parts 7. Next the red lead or other filling material is introduced into the upper ends of the insulators and the insulating cap 10 then is placed in position against the ends of the insulating tubes with the ends of the core members projecting through the holes in the cap. The extensions 2' of the core members which project beyond the cap may now be shaped in any one of the various ways above mentioned. For example, the cap may be pressed up against the ends of the tubes, the extensions 2' may be gripped close to the cap and struck endwise to upset the metal of each extension. Or, the extensions of all the cores of a single plate may be flattened simultaneously or shaped in some other suitable manner. Whatever method is used the distortion of the metal beyond the cap serves to prevent the cap from moving away from the ends of the tubes except upon the application of considerable pressure, and the core extensions hold the cap in any position to which it is moved. The cap therefore is always kept against the ends of the tubes notwithstanding the fact that it may be forced longitudinally of the cores for a considerable distance during the life of the plate.

In supporting these plates in a battery casing such as that shown, for example, at 12 in Fig. 1, the end extensions 2' preferably are so spaced as to straddle the bridge pieces 14 so that the cap 10 will rest directly on the upper edges of the bridges.

The construction provided by this invention obviates any danger of the caps being forced off the ends of the core members and ensures the retension of the cap in its operative position against the ends of the tubes throughout the life of the plate. At the same time any material complication of the manufacturing process is avoided. The mounting of the plates in the battery is not interfered with and is made such as to add to the secure retention of the caps in place, it being understood that a hold-down arrangement is provided in these batteries to prevent the plates from sliding away from the bridge pieces when the battery is inverted.

While I have herein shown and described a preferred embodiment of my invention, it will be understood that the invention may be embodied in other forms without departing from the spirit or scope thereof.

Having thus described my invention, what I desire to claim as new is:

1. A battery plate comprising a series of core members of conducting material, a bus connecting said members at one end of the plate, a tubular insulator encircling each of said members, and an insulating cap closing the ends of said tubular insulators opposite to said bus, said core members projecting through said cap and holding said cap solely by friction, substantially against the ends of said insulators.

2. A battery plate comprising a series of core members of conducting material, a bus connecting said members at one end of the plate, a tubular insulator encircling each of said members, and an insulating cap closing the ends of said tubular insulators opposite to said bus, said core members projecting through said cap and having elongated end portions extending for a substantial distance beyond said cap, said end portions being of such shape that the largest dimension of successive cross-sections taken toward the extremity thereof gradually increases, whereby said cap is held substantially against the ends of said insulators but is permitted to move along said end portions under pressure while being held firmly in any position to which it slides.

3. A battery plate comprising a series of core members of conducting material, a bus connecting said members at one end of the plate, a tubular insulator encircling each of said members, an insulating cap closing the ends of said tubular insulators opposite to said bus, said core members projecting through said cap and having elongated end portions extending for a substantial distance beyond said cap, said end portions increasing in cross-sectional dimensions toward the extremities thereof and being larger in said dimensions than the respective holes in said cap through which they project, whereby they serve to hold said cap against the ends of said tubes notwithstanding the forcing of said cap along said core members toward the extremities thereof when the plate is in use.

GRANT WHEAT.